United States Patent [19]
Daehlin et al.

[11] 3,879,687
[45] Apr. 22, 1975

[54] HIGH SPEED LIGHT BEAM MODULATOR

[75] Inventors: O. Theodore Daehlin, Hopkins; William W. Standke, Minnetonka; Wayne L. Walters, Bloomington, all of Minn.

[73] Assignee: Honeywell, Inc., Minneapolis, Minn.

[22] Filed: Feb. 26, 1973

[21] Appl. No.: 335,988

[52] U.S. Cl. ............... 332/7.51; 350/150; 350/160; 307/268; 250/199
[51] Int. Cl. ............................................. H01s 3/12
[58] Field of Search ............ 350/150, 160; 328/113, 328/223; 181/.5 BM; 307/282, 268; 250/199; 332/7.51; 331/165, 166; 315/27 TP

[56] References Cited
UNITED STATES PATENTS

| | | | |
|---|---|---|---|
| 2,995,709 | 8/1961 | Bearwood et al. | 331/165 |
| 3,426,241 | 2/1969 | Perkins | 315/27 TP |
| 3,518,634 | 6/1970 | Ballman et al. | 350/150 |
| 3,529,206 | 9/1970 | Ropal | 315/27 TP |
| 3,688,153 | 8/1972 | Wheatley | 315/27 TP |
| 3,712,410 | 1/1973 | Gollwitzer et al. | 181/.5 EM |

OTHER PUBLICATIONS

Aagard et al., "Experimental Evaluation of a MnBi Optical Memory System," IEEE Trans. on Magnetics, 9/71, pg. 380–383.

*Primary Examiner*—Maynard R. Wilbur
*Assistant Examiner*—N. Moskowitz
*Attorney, Agent, or Firm*—David R. Fairbairn

[57] ABSTRACT

A high speed light beam modulator includes an electro-optic modulator which is connected in series with an inductor to form a series resonant circuit. Switching means selectively allows current to flow in the inductor for a predetermined period. The switching means then interrupts the flow of current, causing oscillations in the series resonant circuit. The oscillations are damped after the first half cycle of voltage oscillation appearing across the electro-optic modulator.

7 Claims, 7 Drawing Figures

3,879,687

HIGH SPEED LIGHT BEAM MODULATOR

BACKGROUND OF THE INVENTION

The present invention is related to a light beam modulator. In particular, the present invention is directed to a light beam modulator capable of pulsed operation at a high repetition rate.

Considerable research and engineering effort has been expended in recent years in the development of optical techniques for information storage. Optical systems have offered the advantage of improved packing density and reduced mechanical motion over conventional information storage techniques. One highly advantageous optical system was described by R. L. Aagard et al., "Experimental Evaluation of an MnBi Optical Memory System", *IEEE Transactions of Magnetics*, MAG-7, 380 (1971). In this system information is stored on a thin film of manganese bismuth (MnBi) by Curie point writing with a laser. In one typical system light pulses having a peak pulse power of about 20 milliwatts and a 100 nanosecond duration were used for Curie point writing. The repetition rate of the writing pulses was 1 MHz.

Optical memory systems requiring short duration light pulses at a high repetition rate place severe demands on an electro-optic modulator. Electro-optic modulators typically exhibit high capacitance. It is therefore very difficult to apply the necessary high voltage pulses to the electro-optic modulator when the pulse length is 100 nanoseconds or less and the repetition rate is 1 MHz or greater.

SUMMARY OF THE INVENTION

The light beam modulator of the present invention is capable of pulsed operation at high repetition rates. Inductor means is connected to an electro-optic modulator. The capacitive characteristics of the electro-optic modulator and the inductor means form a series resonant circuit. Circuit means connect the inductor means and the electro-optic modulator to a suitable source of electrical energy. Switching means selectively allow current to flow in the inductor means for a predetermined period. The current is then interrupted or blocked by the switching means to cause oscillation in the series resonant circuit. The oscillations in the series resonant circuit are damped by damping means after the first half cycle of voltage oscillation appearing across the electro-optic modulator.

BRIEF DESCRIPTION OF THE DRAWINGS

FIG. 6 shows the light intensity output from the electro-optic modulator and the voltage across the electro-optic modulator as a function of time after the modulator is initially turned on.

DETAILED DESCRIPTION OF THE PREFERRED EMBODIMENT

Figure 1:
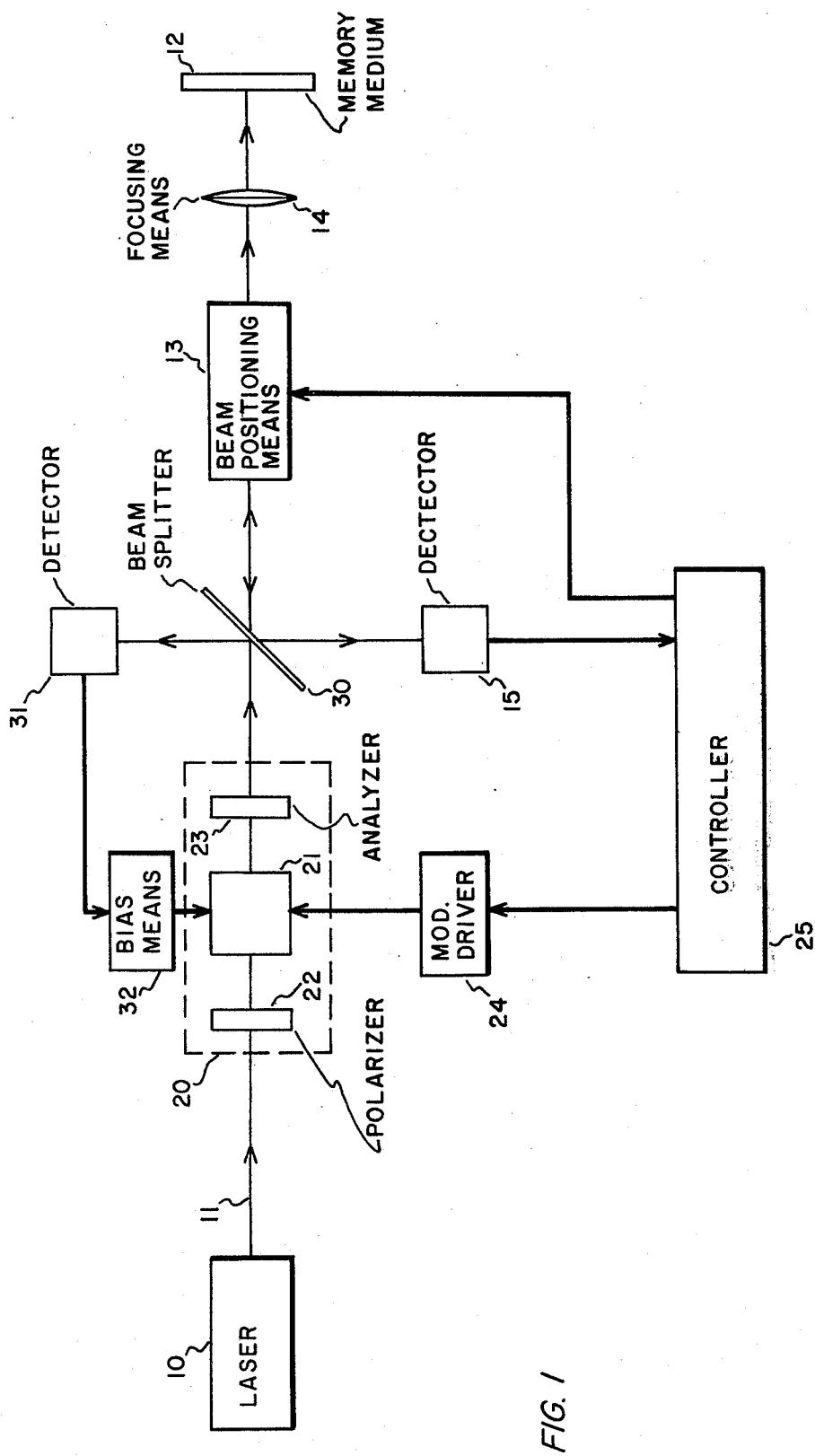
FIG. 1 is a diagrammatic representation of an optical memory system.

FIG. 1 shows a typical optical memory system. A light source such as laser 10 supplies a light beam 11 for writing, reading, and erasing information on memory medium 12. Beam positioning means 13 directs light beam 11 to predetermined locations on memory medium 12. Light beam 11 is focused to a focused light spot at memory medium 12 by focusing means 14. During the reading operation, detector 15 senses the intensity of light received from various locations of memory medium 12.

The intensity of light beam 11 which reaches memory medium 12 is controlled by electro-optic modulator 20. Electro-optic modulator 20 typically comprises an electro-optic crystal 21 positioned between polarizer 22 and analyzer 23. Polarizer 22 and analyzer 23 are crossed so that no light passes through the electro-optic modulator when no voltage is applied to electro-optic crystal 21.

When a bit of information is to be written at a particular location on memory medium 12, modulator driver 24 applies a short duration, high voltage pulse to electro-optic crystal 21. The operation of modulator driver 24 and beam positioning means 13 is controlled by controller 25.

During the reading operation, electro-optic modulator 20 must maintain the intensity of light beam 11 impinging upon memory medium 12 at a stable level. The intensity level of light beam 11 must be sufficient to allow readout of information be detector 15, but must not be so great that the information stored on memory medium 12 is altered. It may also be desirable to maintain the intensity of light beam 11 at the same stable level during the writing stage of operation except when the high voltage writing pulse is applied by modulator driver 24.

The intensity of light beam 11 is maintained at a stable level by beam splitter 30, detector 31, and bias servo means 32. Beam splitter 30 splits off a portion of light beam 11 after it has passed through electro-optic modulator 20. Detector 31 receives the portion of the light beam split off by beam splitter 30 and produces an electrical signal indicative of the intensity of the beam. The electrical signal produced by detector 31 adjusts the bias voltage applied to electro-optic crystal 21 by bias servo means 32.

In one successful optical memory system, laser 10 was a 50 milliwatt helium-neon laser, electro-optic crystal 21 was potassium dihydrogen phosphate (KDP), and memory medium 12 was a MnBi thin film. To achieve Curie point writing, a peak laser power of about 20 milliwatts and a pulse duration of 100 nanoseconds was desired. It was therefore necessary for modulator driver 24 to apply a 220 volt pulse at a 1 MHz repetition rate to electro-optic crystal 21. The application of a high voltage short duration pulse to an electro-optic crystal of rather high capacitance presents a difficult technical problem.

Figure 2:
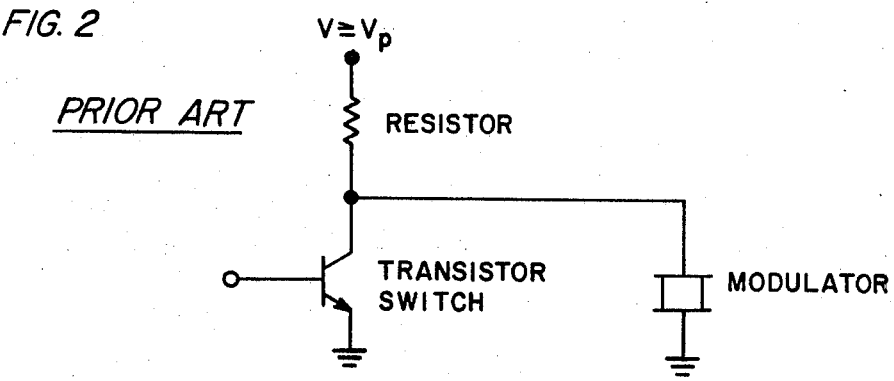
FIG. 2 is a schematic diagram of a prior art light beam modulator and driving circuit.

FIG. 2 shows a prior art technique for applying short duration, high voltage pulses to an electro-optic modulator. A transistor switch is connected in parallel with the electro-optic modulator. The resistor is connected in series with the modulator and the transistor switch. A voltage which is greater than or equal to the peak voltage to be applied across the electro-optic modulator is applied to one terminal of the resistor.

In operation, the transistor switch is normally in a conducting or "on" state. When a high power light pulse is required for writing, an input signal is applied to the base of the transistor switch. This input signal rapidly turns the transistor switch from the on state to a non-conducting or "off" state. Current flows through resistor to the modulator and the voltage across the modulator rises. When the desired peak voltage is obtained, the input signal rapidly turns the transistor switch from the off to the on state. The transistor switch therefore shunts the electro-optic modulator and the voltage across the modulator decreases.

The prior art technique has several disadvantages. First, it requires a high voltage power supply. Second, the resistor must be of low resistance since the rise time of the voltage pulse on the modulator is determined by the product of the resistance of the resistor and the capacitance of the modulator. The low resistance of the resistor allows a large amount of current to flow through the transistor switch when the transistor switch is turned on. Transistors which are capable of both high speed operation and high current carrying capacity are uncommon. Third, the circuit dissipates a considerable amount of power since the transistor switch is turned on and current is flowing during the entire time that the modulator is turned off.

Figure 3:
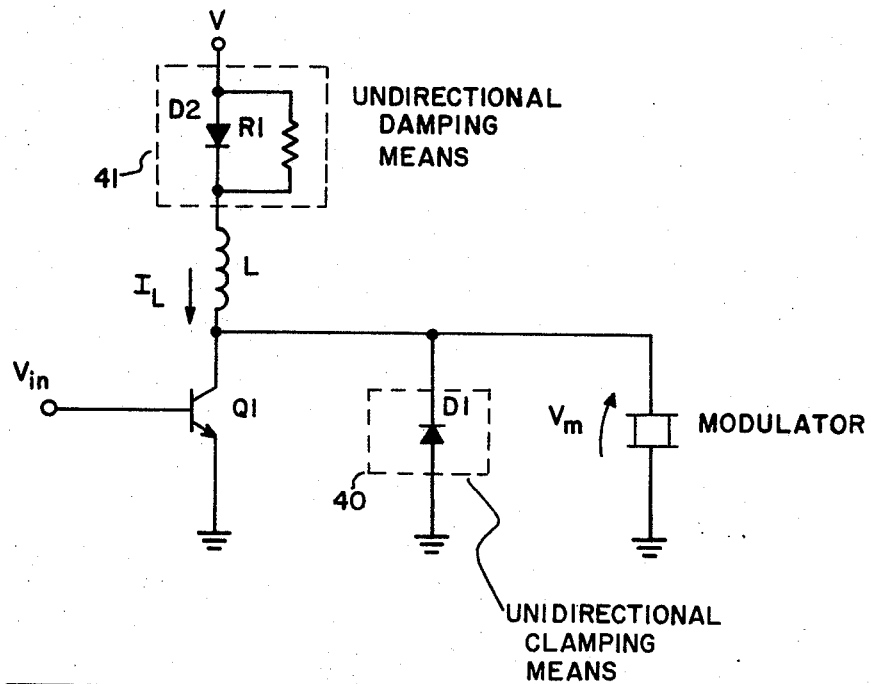
FIG. 3 is a schematic diagram of the high speed light beam modulator of the present invention.

FIG. 3 shows a high speed electro-optic modulator capable of overcoming the disadvantages of the prior art system. Inductor L is connected in series with electro-optic modulator 20 to form a series resonant circuit. Transistor switching means Q1 is connected in series with inductor means L and in parallel with electro-optic modulator 20. Damping means comprising unidirectional means 40 and unidirectional damping means 41 are also provided. Unidirectional clamping means 40 comprises diode D1 connected in parallel with electro-optic modulator 20. Unidirectional damping means 41, which comprises diode D2 and resistor R1 connected in parallel, is connected in series with inductor L.

Figure 4:
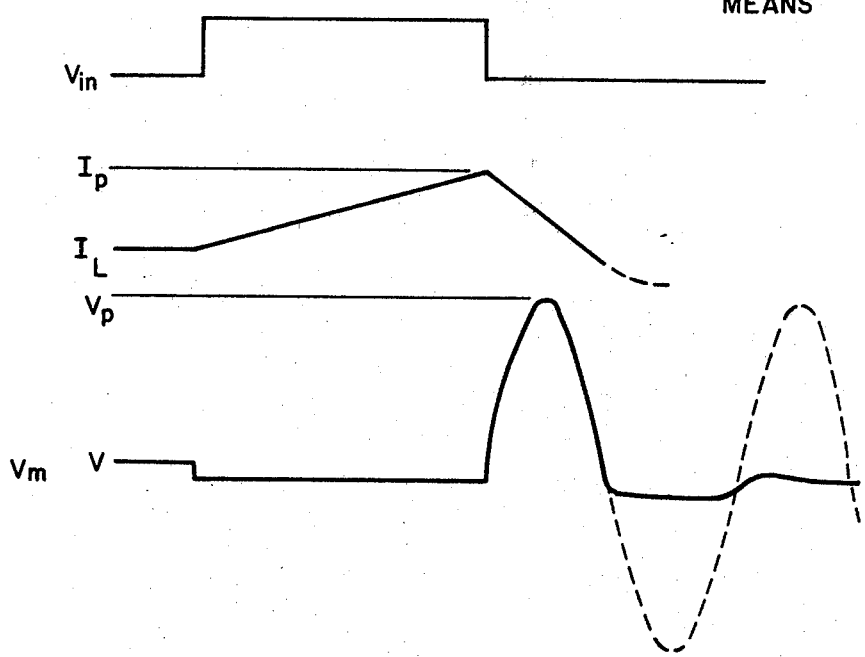
FIG. 4 shows the input voltage to the switching means, the current in the inductor means, and the voltage across the electro-optic modulator, respectively, as a function of time.

When a laser pulse is required for writing, a square wave input voltage $V_{in}$ is applied to the base of transistor switching means Q1. The square wave input voltage pulse is shown in FIG. 4a. Transistor switching means Q1 is turned on by the input voltage pulse and allows current to flow in inductor means L. The current $I_L$ passing through inductor L continually increases during the time that transistor Q1 is turned on. As shown in FIG. 4b, current $I_L$ is allowed to reach a predetermined peak current $I_p$. When current $I_L$ reaches peak current $I_p$, Q1 is turned off, as shown in FIG. 4a. The energy stored in inductor L is dumped into the electro-optic modulator 20 and oscillation begins in the series resonant circuit.

As shown in FIG. 4c, the voltage $V_M$ across electro-optic modulator 20 rises rapidly after transistor switching means Q1 is turned off. The peak voltage $V_P$ which is applied to electro-optic modulator 20 is determined by the peak current $I_P$ which was attained while Q1 was turned on. The peak voltage $V_P$ may be described by the following formula:

$$V_P = I_P Z_o,$$

where $$Z_o \cong \sqrt{L/C}.$$

If damping means were not provided, the oscillation of the series resonant circuit would continue until damped out by the resistance losses of the inductor L and the electro-optic modulator 20. In the present invention, however, all that is desired is a single high voltage, short duration voltage pulse applied across electro-optic modulator 20. This is achieved by the first half cycle of voltage oscillation in the series resonant circuit.

Unidirectional clamping means 40, which may comprise diode means D1, clamps the voltage across electro-optic modulator 20 during the second half cycle of voltage oscillation. Resistor R1 and diode means D2, which comprise unidirectional damping means 41, damp further oscillation of the series resonant circuit. The amount of damping by unidirectional damping means 41 is determined by the resistance of resistor R1. It has been found desirable to select the resistance of R1 such that the series resonant circuit is slightly underdamped. The duration of the first half cycle of voltage oscillation is shorter in the underdamped condition than if the series resonant circuit is critically damped.

Figure 5:
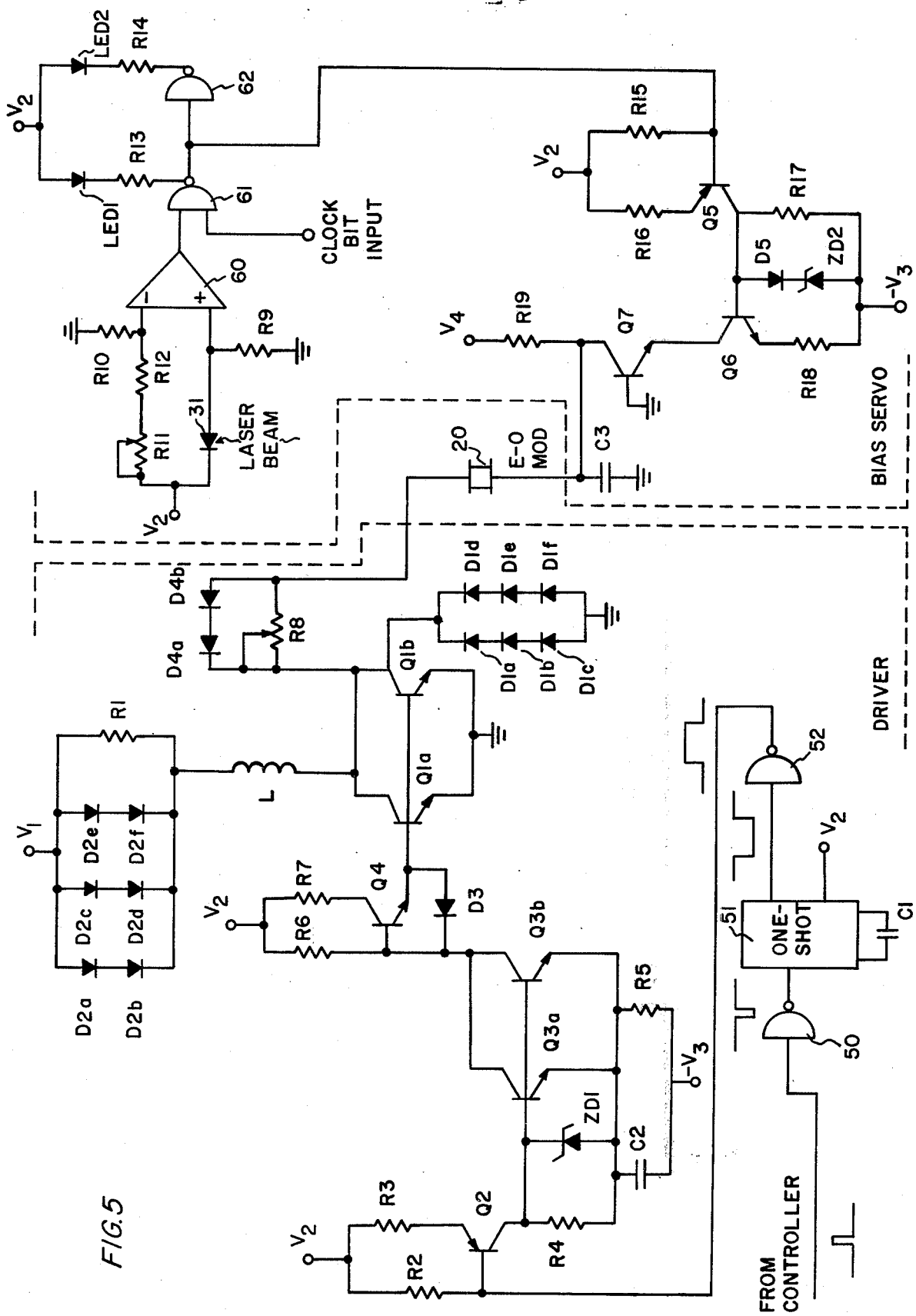
FIG. 5 shows a high speed light beam modulator including means for biasing the electro-optic modulator.

In FIG. 5 is shown a schematic diagram of another successful embodiment of the present invention. The modulator driver circuitry applied 220 volt pulses having a rise and fall time of 60 nanoseconds and a 1 MHz repetition rate to a KDP electro-optic modulator 20. The bias servo means maintained the light output intensity passing through the electro-optic modulator to within one per cent of the desired intensity.

Inductor L and electro-optic modulator 20 form a series resonant circuit. The frequency of the oscillations in the series resonant circuit and therefore the duration of the voltage pulse applied to electro-optic modulator 20 is determined by the inductance of inductor L and the capacitance of electro-optic modulator 20. Thus for a particular electrooptic modulator, the voltage pulse duration can be selected by properly selecting inductor L.

Transistors Q1a and Q1b comprise the switching means for selectively allowing current to flow in inductor L and then interrupting that current flow. Transistors Q1a and Q1b are connected in tandem to provide the necessary current carrying capacity without sacrificing the necessary switching speed.

As shown in FIG. 5, series--parallel combinations of diodes replace the single diodes D1 and D2 shown in FIG. 3. The diodes are connected in series to provide the necessary voltage breakdown characteristics and are connected in parallel to provide the necessary current carrying capacity.

In the steady or quiescent state of operation of the modulator driver, transistors Q1a and Q1b are turned off. Essentially no current is flowing through inductor L. Transistors Q2, Q3a and Q3b are turned on, while transistor Q4 is turned off.

When a high power laser pulse is required for writing, controller 25 directs a modulator gate pulse to the modulator driver. Inverter 50 inverts the modulator gate pulse and directs the inverted pulse to one shot circuit 51. The inverted gate pulse triggers one shot circuit 51, which produces a one shot pulse of predetermined duration. The duration of the pulse is determined by one shot timing capacitor C1.

The one shot pulse is inverted by inverter 52 and applied to the base of transistor Q2. The one shot pulse turns transistor Q2 off, which turns transistors Q3a and Q3b off and transistor Q4 on. The emitter of transistor Q4 is connected to the base of Q1a and the base of Q1b. Thus when transistor Q4 is turned on, transistors Q1a and Q1b are also turned on. Current $I_L$ is allowed to build up to a peak current $I_P$ which is determined by voltage $V_1$ and the duration of the one shot pulse. At the termination of the one shot pulse, the voltage on the base of transistor Q2 goes to zero, and transistors Q2, Q3a and Q3b are turned on. Transistors Q4 and Q1a and Q1b are turned off, thus causing a high inductive back emf which drives the collectors of transistors Q1a and Q1b up to 220 volts. This 220 volts is applied through potentiometer R8 to electro-optic modulator 20. The resistance of potentiometer R8 can be varied to control the pulse amplitude at the modulator crystal.

As described previously with reference to FIG. 3, the unidirectional clamping means comprising diodes D1a through D1f clamps the second half cycle of voltage oscillation appearing across electro-optic modulator 20. Further oscillations are damped out by the unidirectional damping means comprising diodes D2a through D2f and resistor R1. b The amplitude and duration of the voltage pulse applied to electro-optic modulator 20 depends upon the switching time of transistors Q1a and Q1b. To accelerate the turn off time of transistors Q1a and Q1b at the end of the one shot pulse, base electrodes of transistors Q1a and Q1bb are connected to negative potential $-V_3$ through diode D3, transistors Q3a and Q3b, and resistor R5. At the end of the one shot pulse, transistors Q3a and Q3b turn on, thus connecting the base electrodes of transistors Q1a and Q1b to negative potential $-V_3$. Thus a reverse bias voltage is applied to transistors Q1a and Q1b which accelerates the turn off time of the transistors by reducing the base —collector junction storage time and the collector current fall time in transistors Q1a and Q1b.

During the reading mode of operation in an optical memory, temperature variations can affect the amount of light intensity passing through the modulator. These variations in light intensity adversely affect the reliability of optical readout. As a result, it is necessary to provide a bias servo system to sense the power output of the modulated laser beam and control the voltage at the modulator in a manner such that the light intensity tends to remain constant.

As shown in FIG. 5, detector 31 is a PIN photodiode. The portion of the light beam incident on photodiode 31 provides a current into resistor R9 which is connected to one input of differential comparator 60. The voltage across resistor R9 is compared to the voltage across resistor R10, which is connected to the other terminal of differential comparator 60. The current into resistor R10 is controlled by resistor R12 and potentiometer R11. If the light intensity exceeds the desired intensity, the positive terminal of the differential comparator 60 goes positive and the differential comparator 60 is turned on. The output of NAND gate 61 goes to zero, thus turning on light emitting diode LED1, which is the high intensity indicator. The output of NAND gate 61 is inverted by inverter 62, and the low intensity indicator LED2 is turned off.

The output of NAND gate 61 is also connected to the base of transistor Q5. When the intensity of the laser beam exceeds the desired intensity, the output of NAND gate 61 goes from a high to a low state, and transistor Q5 is therefore turned on. Transistor Q6, whose base is connected to the collector of transistor Q5 is also turned on, as is transistor Q7. Current therefore flows from high voltage potential $V_4$ through resistor R19, transistor Q7, transistor Q6 and resistor R18 to negative potential $-V_3$. The voltage applied to elector-optic modulator 20 is therefore reduced, thereby decreasing the light intensity. Bias voltage applied to electro-optic modulator 20 will continue to be decreased until it has reached a magnitude at which differential comparator 60 turns off, thus turning off transistors Q5, Q6 and Q7. In this manner the bias servo circuitry is continually hunting back and forth by turning the differential comparator 60 on and off in order to regulate to within 1% of the desired steady state light beam intensity.

When a high voltage pulse is applied to electro-optic modulator 20 by the modulator driver circuitry, capacitor C3 acts as a bypass capacitor so that the high voltage pulse is not fed back into the bias servo circuitry. Capacitor C3 also performs another important function. The time constant determined by resistor R19 and capacitor C3 controls the rate of change of the bias voltage. In order to avoid excessive hunting, any changes in the bias voltage should be slower than the time required by the bias servo circuitry to generate a feedback signal.

Transistor Q6 is a fast switching transistor. In order to protect transistor Q6 from high voltage, transistor Q7 is connected between transistor Q6 and resistor R19. Transistor Q7 does not have as fast a switching speed as transistor Q6, but does have large collector to emitter breakdown capabilities. Transistor Q7 therefore protects transistor Q6 from high voltage.

When the modulator is operated at 1 MHz, the high power write pulses are received by detector 31 and directed to differential comparator 60. The bias servo circuitry would tend to adjust the steady state bias voltage on electro-optic modulator 20 accordingly. Thus the bias servo circuitry would tend to be duty cycle sensitive during the writing operation. To avoid the operation of the bias servo circuitry during the high power write pulse, a clock bit input is applied to NAND gate 61 to disenable the bias servo circuitry. The clock bit input is applied every one microsecond whether or not a high voltage pulse is being applied to electro-optic modulator 20, thus assuring that the bias servo circuitry is not duty cycle sensitive.

The following table shows the component values and supply voltages used in one embodiment of the circuit shown in FIG. 5.

| Resistors | |
| --- | --- |
| R1 | 150 Ohms |
| R2 | 200 Ohms |
| R3 | 150 Ohms |
| R4 | 100 Ohms |
| R5 | 1K Ohms |
| R6 | 200 Ohms |
| R7 | 16 Ohms |
| R8 | 500 Ohms potentiometer |
| R9 | 3K Ohms |
| R10 | 3K Ohms |
| R11 | 50K Ohms potentiometer |

-Continued

| Resistors | |
|---|---|
| R12 | 10K Ohms |
| R13 | 300 Ohms |
| R14 | 300 Ohms |
| R15 | 1K Ohms |
| R16 | 1K Ohms |
| R17 | 1K Ohms |
| R18 | 390 Ohms |
| R19 | 68K Ohms |
| Inductor | |
| L | 5µh |
| Transistors | |
| Q1a, Q1b | SDT6908 (Solitron) |
| Q2 | 2N5023 |
| Q3a, Q3b | 2N3724 |
| Q4 | 2N3724 |
| Q5 | 2N4034 |
| Q6 | 2N3724 |
| Q7 | 2N3440 |
| E-O Modulator | |
| 20 | 110 pf |
| Capacitors | |
| C1 | 0.1 µf |
| C2 | 0.1 µf |
| C3 | 0.1 µf |
| Diodes | |
| D1a – D1f | 1N4607 |
| D2a – D2f | 1N4607 |
| D3 | 1N4607 |
| D4 | 1N4607 |
| D5 | 1N4607 |
| Zener Diodes | |
| ZD1 | 1N746 |
| ZD2 | 1N746 |
| Light Emitting Diodes | |
| LED1 | Red-Lit 2 (Litronix) |
| LED2 | Red-Lit 2 (Litronix) |
| Photodiode | |
| 31 | PIN5 |
| Integrated Circuits | |
| One-shot 51 | 362 Signetics |
| Inverters 50, 52, 62 | 8890 |
| NAND gate 61 | |
| Differential comparator 60 | 526 |

Figure 6:
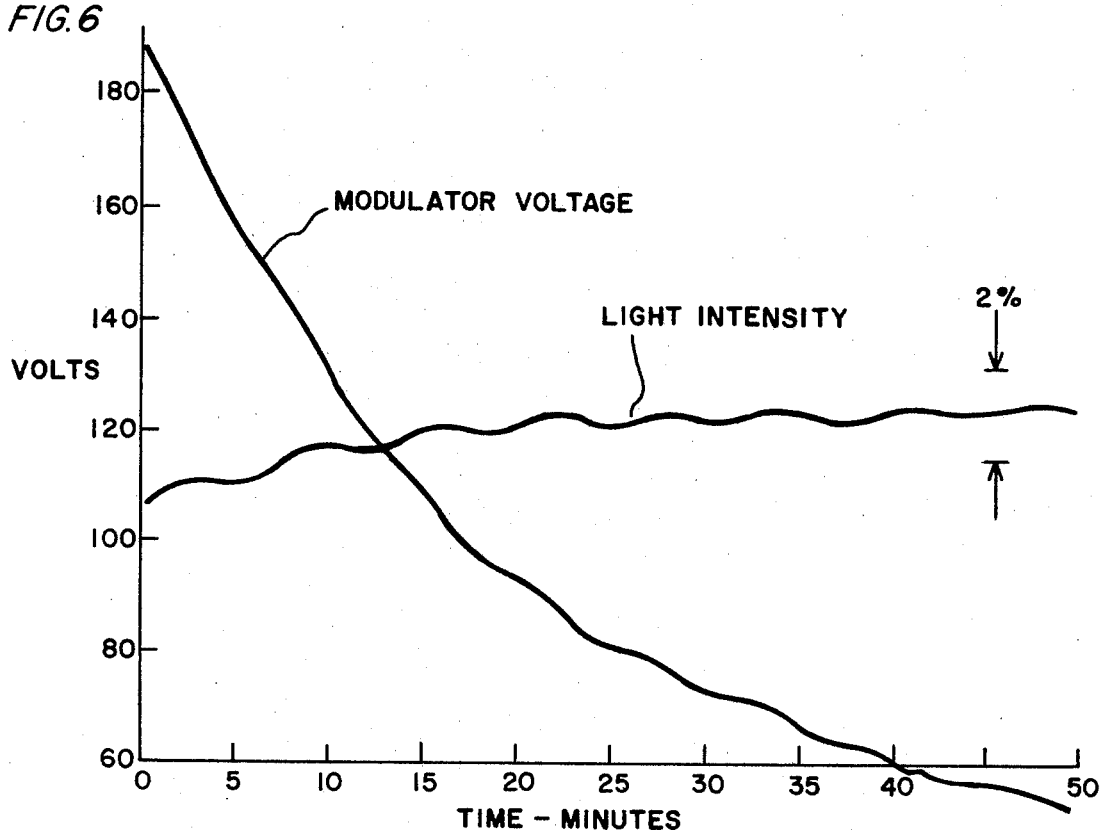

FIG. 6 shows the light intensity output from the modulator and the bias voltage applied to the modulator as a function of time when the system of FIG. 5 was first turned on. During the time shown in FIG. 6, the room temperature varied by 11°F and the light intensity showed a total change of about 4% from start up until stabilization.

Figure 7:
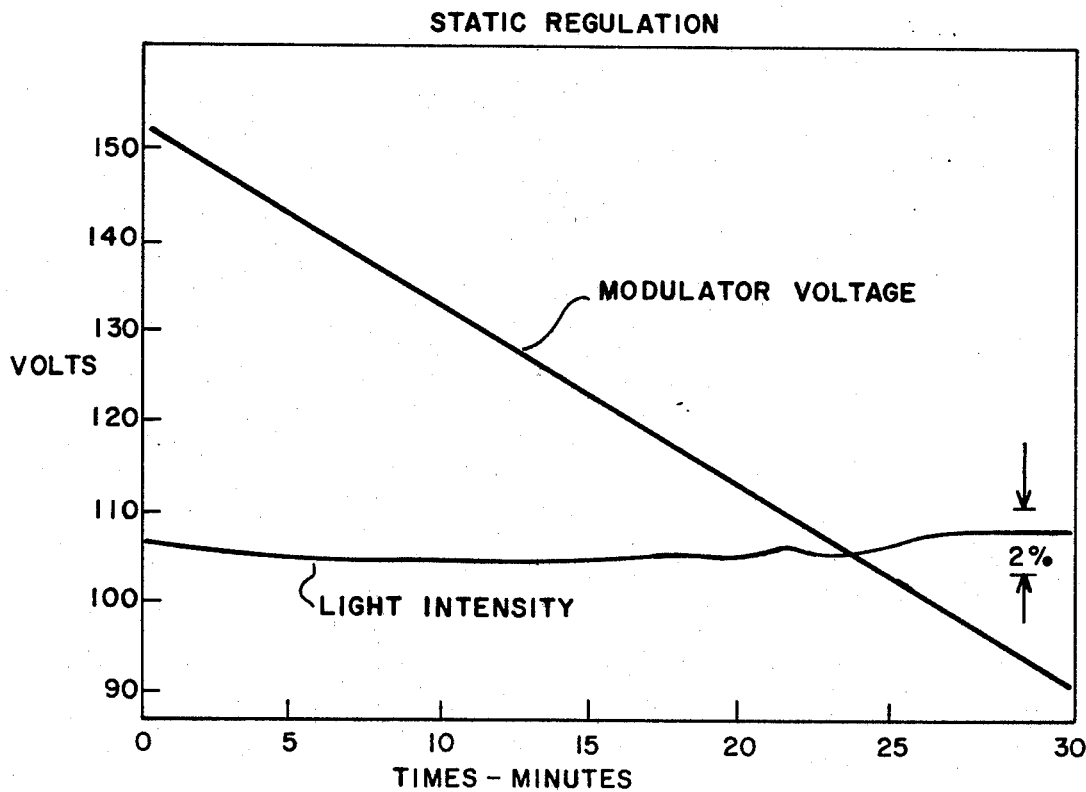
FIG. 7 shows light intensity output of the modulator and voltage across the modulator as a function of time after temperature has been stabilized.

FIG. 7 shows the regulation of light intensity as a function of time after the temperature of the room had been stabilized. It can be seen that the regulation of light intensity was within 1%.

In conclusion, the high speed modulator of the present invention is capable of pulsed operation at repetition rates of 1 MHz or greater. In addition, the high speed modulator has low power consumption, a relatively small number of electrical components, and requires only a low voltage power supply to produce high voltage pulses. In one preferred embodiment, bias servo circuitry regulates the steady state light intensity to within 1%. It will be understood by skilled workers in the art that changes in form and detail may be made without departing from the spirit and scope of the present invention.

The embodiments of the invention in which an exclusive property or right is claimed are defined as follows:

1. A high speed light beam modulator comprising:
   an electro-optic modulator having capacitive characteristics,
   inductor means connected to the electro-optic modulator to form a series resonant circuit with the capacitance of the electro-optic modulator,
   circuit means for connecting the inductor means and the electro-optic modulator to a suitable source of electrical energy,
   switching means in the circuit means for selectively allowing current to flow in the inductor means for a predetermined period, and then interrupting the flow of current to cause oscillations in the series resonant circuit, and
   damping means for damping oscillations in the series resonant circuit after the first half cycle of voltage oscillation appearing across the electro-optic modulator.

2. The high speed light beam modulator of claim 1 wherein the damping means comprises:
   unidirectional clamping means for clamping the voltage across the electro-optic modulator during the second half-cycle of voltage oscillation, and
   unidirectional damping means for damping further oscillation of the series resonant circuit.

3. The high speed light beam modulator of claim 1 wherein the switching means comprises transistor switching means connected in parallel with the electro-optic modulator and in series with the inductor means.

4. The high speed light beam modulator of claim 3 wherein the switching means further comprises timing means for turning the transistor switching means on for a predetermined period to allow current to flow in the inductor means and then turning the transistor switching means off to cause oscillation in the series resonant circuit.

5. The high speed light beam modulator of claim 4 wherein the timing means comprises a one-shot.

6. The high speed light beam modulator of claim 1 and further comprising:
   detector means for detecting the intensity of at least a portion of the light beam passed by the electro-optic modulator and for producing a detector signal indicative of the intensity,
   reference signal producing means for producing a reference signal indicative of the desired intensity of the portion of the light beam,
   comparing means for comparing the reference signal and the detector signal and producing an error signal indicative of the comparison,
   biasing means for applying a bias voltage to the electro-optic modulator, and
   bias feedback means for controlling the biasing means in response to the error signal.

7. The high speed light beam modulator of claim 6 and further comprising bypass means for disenabling the bias feedback means when a voltage oscillation appears across the electro-optic modulator.

* * * * *